(12) United States Patent
Clark et al.

(10) Patent No.: US 9,007,598 B1
(45) Date of Patent: Apr. 14, 2015

(54) MINIMALLY-THREADED SCREW TO REDUCE ALIGNMENT SHIFTS

(71) Applicant: Honeywell International Inc., Morristown, NJ (US)

(72) Inventors: Matthew Clark, Blaine, MN (US); Alan Bruce Touchberry, St. Louis Park, MN (US); Gordon Allen Seppanen, Mounds View, MN (US); Steven P. Ecklund, St. Anthony, MN (US); Mark Petersen, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 44 days.

(21) Appl. No.: 14/079,829

(22) Filed: Nov. 14, 2013

(51) Int. Cl.
*G01C 19/66* (2006.01)
*G01C 25/00* (2006.01)

(52) U.S. Cl.
CPC ............ *G01C 19/661* (2013.01); *G01C 25/005* (2013.01); *G01C 19/66* (2013.01)

(58) Field of Classification Search
CPC ...... G01C 19/66; G01C 19/661; G01C 19/68; G01C 19/70; G01C 25/005
See application file for complete search history.

(56) References Cited

U.S. PATENT DOCUMENTS

| | | | |
|---|---|---|---|
| 1,675,914 A | 7/1928 | Silver | |
| 3,221,565 A | 12/1965 | Zatsky et al. | |
| 3,269,793 A | 8/1966 | White, Jr. | |
| 4,472,098 A | 9/1984 | Kiefer | |
| 4,771,644 A * | 9/1988 | Meron | 74/5.22 |
| 5,116,130 A * | 5/1992 | Butler | 356/476 |
| 5,422,722 A * | 6/1995 | Beckwith et al. | 356/459 |
| 5,973,717 A | 10/1999 | Kerr et al. | |
| 6,259,849 B1 * | 7/2001 | McLean et al. | 385/134 |
| 6,712,159 B2 | 3/2004 | Estes et al. | |
| 7,922,125 B2 | 4/2011 | Lancho Doncel | |
| 2012/0251257 A1 | 10/2012 | Tipps et al. | |
| 2013/0170900 A1 | 7/2013 | Bay | |
| 2013/0222929 A1 | 8/2013 | Park | |

FOREIGN PATENT DOCUMENTS

WO          9962757          12/1999

OTHER PUBLICATIONS

"Moving Mechanical Assemblies for Space and Launch Vehicles", 2005, pp. i-39, Publisher: American Institute of Aeronautics and Astronautics.
Sandbrook et al., "Improve Flange Joint Reliability", "Back to Basics", Jan. 2011, pp. 31-37.

* cited by examiner

*Primary Examiner* — Michael A Lyons
(74) *Attorney, Agent, or Firm* — Fogg & Powers LLC

(57) ABSTRACT

A ring laser gyroscope configured to reduce alignment shifts in at least one critical alignment of the ring laser gyroscope is provided. The ring laser gyroscope includes reflective components configured to direct clockwise optical beams and counter-clockwise optical beams in at least one lasing plane; at least one ring-laser-gyro mounting feature having at least one respective through hole; and at least one minimally-threaded screw positioned in the at least one respective through hole. An unthreaded section of the minimally-threaded screw is contactlessly encased in the at least one respective through hole. A threaded-end of the at least one minimally-threaded screw is threaded in a respective at least one threaded hole in a gyro frame, the gyro frame spanning a reference mounting plane.

20 Claims, 11 Drawing Sheets

MINIMALLY-THREADED SCREW TO REDUCE ALIGNMENT SHIFTS

BACKGROUND

Ring laser gyroscopes (RLG) include reflectors (typically 3 or 4 reflectors) aligned to direct counter propagating optical beams in a lasing plane that is perpendicular to the sense axis of the ring laser gyroscope. A gyroscope frame holds the ring laser gyroscope in a plane referred to herein as a reference mounting plane.

The ring laser gyroscope includes a gyro mounting feature that is screwed onto the gyro frame. Any unintentional contact between the gyro mounting feature and a screw that attaches the gyro mounting feature to the gyro frame can cause a shift in the critical angular relationship between the lasing plane and the reference mounting plane. This shift is exacerbated over temperature swings to which gyros are typically exposed.

FIGS. 8A and 8B show a prior art screw 650 inserted through a gyro mounting feature 31 attached to a gyro frame 100 at a first temperature $T_1$ and a second temperature $T_2$, respectively. The entire length L of the shaft of the prior art screw 650 is threaded. The prior art screw 650 is situated in a through hole 125 formed in the gyro mounting feature 31. A distal end of the screw 650 is screwed into a screw hole 110 in the gyro frame 100. As shown in FIG. 8A, the lasing plane is spanned by axes $(X_L, Y_L)$ and the reference mounting plane is spanned by the axes $(X_M, Y_M)$. The axis $Z_L$ is perpendicular to the lasing plane $(X_L, Y_L)$ and the axis $Z_M$ is perpendicular to the reference mounting plane. In FIG. 8A, the critical angular relationship between the lasing plane $(X_L, Y_L)$ and the reference mounting plane $(X_M, Y_M)$ is indicated by the angular offset $\alpha_x$ between the $X_M$ and $X_L$ axes and by the angular offset $\alpha_z$ between the $Z_M$ and $Z_L$ axes. The gyroscope is calibrated to account for this small angular offset between the lasing plane $(X_L, Y_L)$ and the reference mounting plane $(X_M, Y_M)$.

As shown in FIG. 8A, one thread 655 unintentionally contacts the side wall 119 of the through hole 125 when the device is at first temperature $T_1$. As shown in FIG. 8B, the thread 655 bites further into the side wall 119 of the through hole 125 as the temperature shifts from a first temperature $T_1$ to a second temperature $T_2$. This change in temperature thus causes a slight shift in the small angular relationship $(a_x, a_z)$ between the lasing plane $(X_L, Y_L)$ and the reference mounting plane $(X_M, Y_M)$ shown in FIG. 8A. In FIG. 8B, the critical angular relationship between the lasing plane $(X_L, Y_L)$ and the reference mounting plane $(X_M, Y_M)$ is indicated by the angle $\beta_x$ between the $X_M$ and $X_L$ axes and by the angle $\beta_z$ between the $Z_M$ and $Z_L$ axes. Thus, the critical angular relationship between the lasing plane and the reference mounting plane wobbles between at least two different angles.

When the lasing plane $(X_L, Y_L)$ shifts with reference to the reference mounting plane $(X_M, Y_M)$, the original calibration of the ring laser gyro is no longer accurate. If the angular relationship between the lasing plane $(X_L, Y_L)$ and the reference mounting plane $(X_M, Y_M)$ is wobbling due to temperature effects, any attempts to recalibrate only provide a temporary fix. Less than ideal information (inaccurate data) from the gyro degrades the navigation performance.

For a multi-axis ring laser gyroscope, in which two or more ring laser gyroscopes (each having a gyro mounting feature) are orthogonally mounted with respect to each other, an unintentional contact between one or more of the two or more gyro mounting features and the screw attaching the gyro mounting feature to the gyro frame can cause a shift in the critical angular relationship between the sense axes of each of the two or more ring laser gyroscopes.

SUMMARY

The present application relates to ring laser gyroscope configured to reduce alignment shifts in at least one critical alignment of the ring laser gyroscope. The ring laser gyroscope includes reflective components configured to direct clockwise optical beams and counter-clockwise optical beams in at least one lasing plane; at least one ring-laser-gyro mounting feature having at least one respective through hole; and at least one minimally-threaded screw positioned in the at least one respective through hole. An unthreaded section of the minimally-threaded screw is contactlessly encased in the at least one respective through hole. A threaded-end of the at least one minimally-threaded screw is threaded in a respective at least one threaded hole in a gyro frame, the gyro frame spanning a reference mounting plane.

DRAWINGS

Understanding that the drawings depict only exemplary embodiments and are not therefore to be considered limiting in scope, the exemplary embodiments will be described with additional specificity and detail through the use of the accompanying drawings, in which.

Figures 1A, 1B:
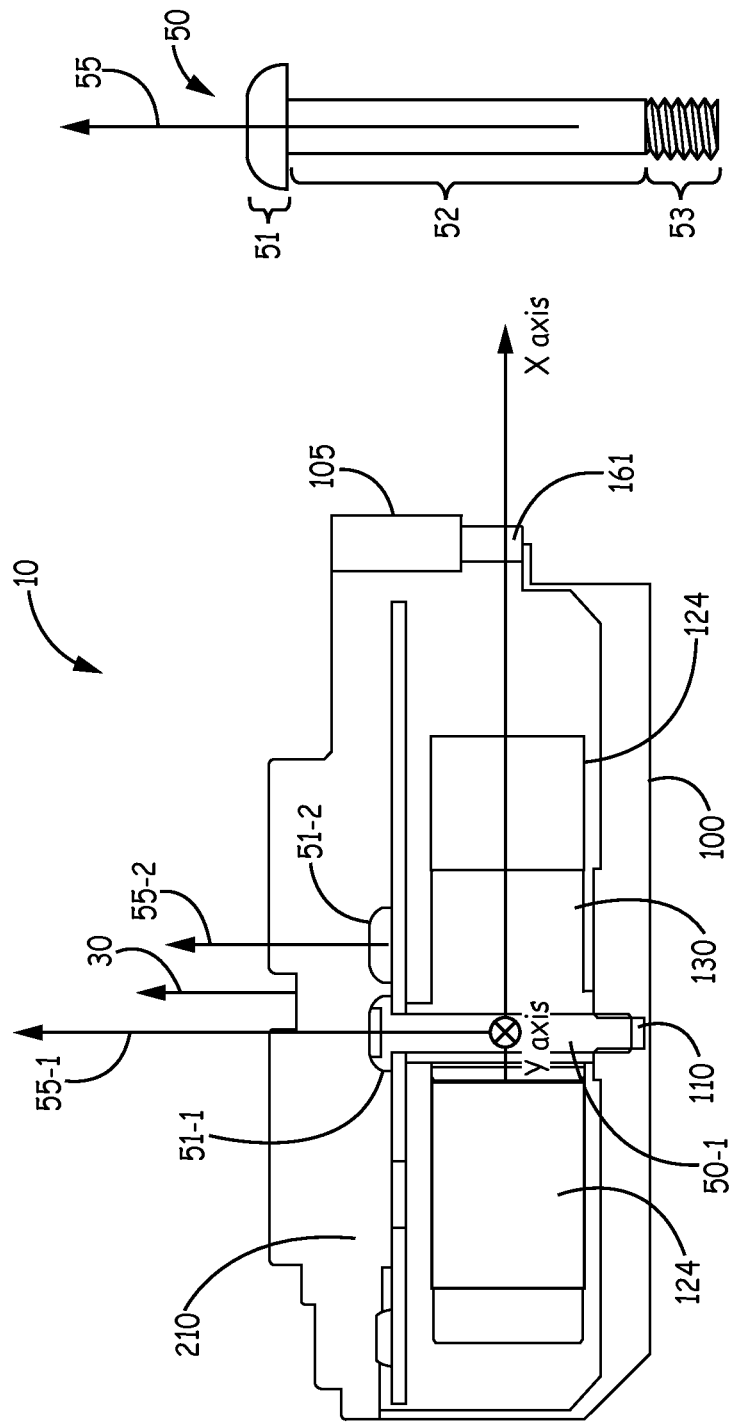
FIG. 1A is a cross-sectional view of an embodiment of a single axis ring laser gyroscope configured to reduce alignment shifts between a lasing plane in the ring laser gyroscope and a reference mounting plane in a gyro frame in accordance with the teachings of the present application.
FIG. 1B is a side view of a minimally-threaded screw to reduce alignment shifts in at least one critical angle in a ring laser gyroscope in accordance with the teachings of the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The ring laser gyroscopes described herein are configured to reduce alignment shifts in at least one critical alignment of the ring laser gyroscope. The embodiments of ring laser gyroscopes described below minimize or prevent changes in at least one critical alignment of the ring laser gyroscope and therefore minimize or prevent output of erroneous data from a ring laser gyroscope due to alignment shifts.

When the ring laser gyroscope is a single-sense-axis RLG, the at least one critical angular relationship is the angular relationship between the lasing plane of the ring laser gyroscope and the reference mounting plane of the gyro frame. Specifically, in order for a single ring laser gyroscope to provide correct data over time, the angular relationship between the lasing plane of the counter propagating optical beams and a reference mounting plane must be maintained over time. The reference mounting plane can be: 1) a plane of the gyro frame, 2) a surface of the gyro frame; 3) a plane of a gyro housing that houses the ring laser gyroscope; and 4) a surface of the gyro housing the ring laser gyroscope. In the latter two embodiments, the ring laser gyroscope is attached to the gyro housing. When the reference mounting plane is a surface of a gyro frame or a gyro housing the reference mounting plane is referred to herein as a reference mounting surface.

When the ring laser gyroscope is a multiple-sense-axis RLG, the at least one critical angular relationship is the angular relationships between the multiple sense axes of the multiple-sense-axis RLG. In order for a multi-axis ring laser gyroscope (i.e., a triad gyro) to provide correct data over time, the angular relationship between pairs of multiple sense axes must be maintained over time. Specifically, for a ring laser gyroscope with three sense axes, the at least one critical angular relationship is the angular relationship between a first sense axis and a second sense axis, between the second sense axis and a third sense axis, and between third sense axis and the first sense axis.

The embodiments of the ring laser gyroscope to reduce alignment shifts in at least one critical alignment of the ring laser gyroscope described herein include reflective components configured to direct clockwise optical beams and counter-clockwise optical beams in at least one lasing plane, at least one ring-laser-gyro mounting feature having at least one respective through hole, and at least one minimally-threaded screw positioned in the at least one respective through hole. A threaded-end of the at least one minimally-threaded screw is threaded in a respective at least one threaded hole in a gyro frame. The gyro frame spans a reference mounting plane. An unthreaded section of the minimally-threaded screw is contactlessly encased in the at least one through hole. In one implementation of this embodiment, the ring-laser-gyro mounting feature is a motor drive. In another implementation of this embodiment, the ring-laser-gyro mounting feature is a plug. In yet another implementation of this embodiment, the ring-laser-gyro mounting feature is a mounting frame. In yet another implementation of this embodiment, the gyro frame is a gyro housing.

Figure 2A:
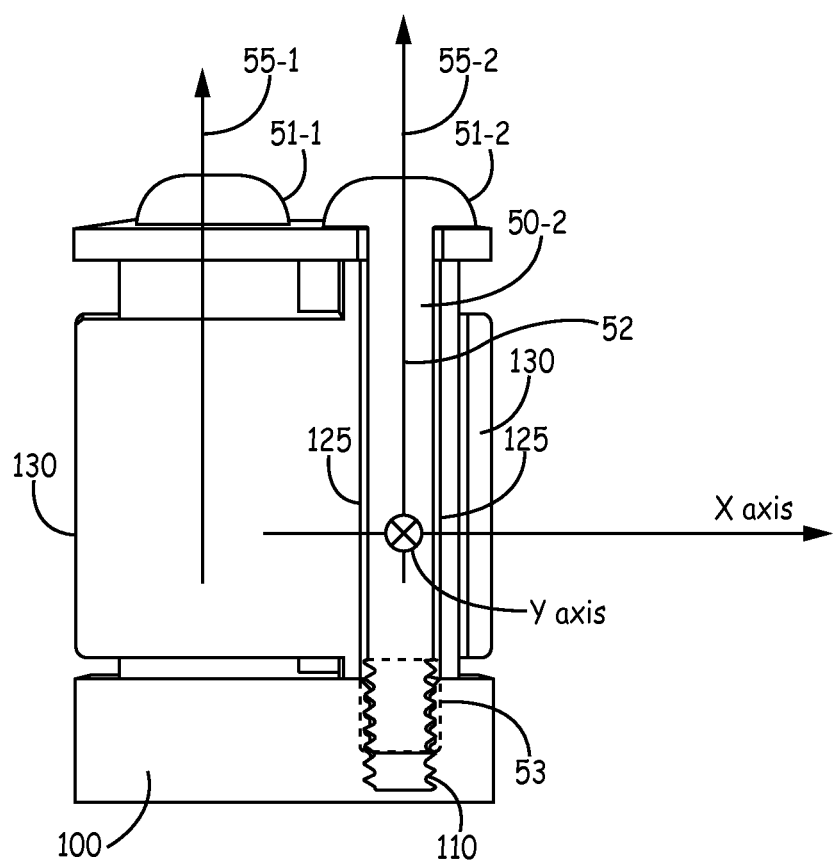
FIG. 2A is an enlarged cross-sectional view of a minimally-threaded screw in a through hole of a ring laser gyroscope in accordance with the teachings of the present application.
Figure 2B:
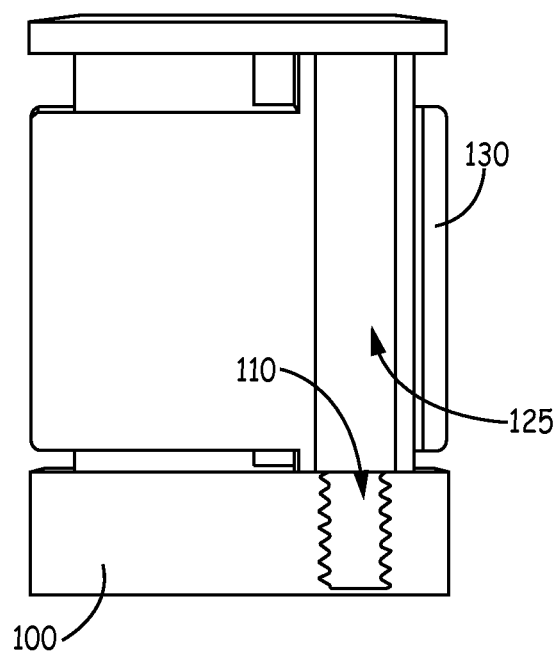
FIG. 2B is an enlarged cross-sectional view of a through hole in the ring laser gyroscope in accordance with the teachings of the present application.
Figure 3:
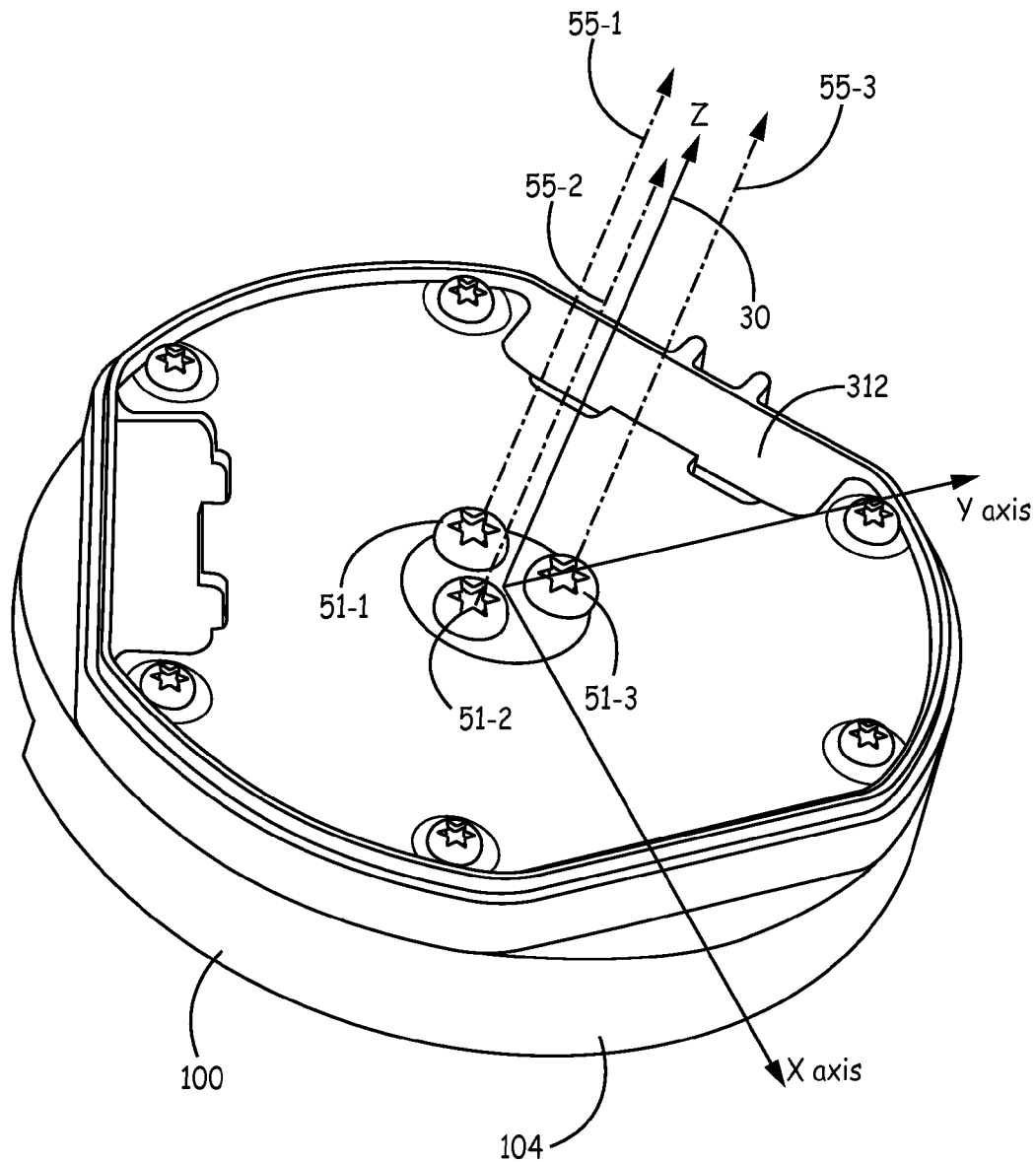
FIG. 3 is an oblique view of the ring laser gyroscope of FIG. 1A with a top cover removed.
Figure 4:
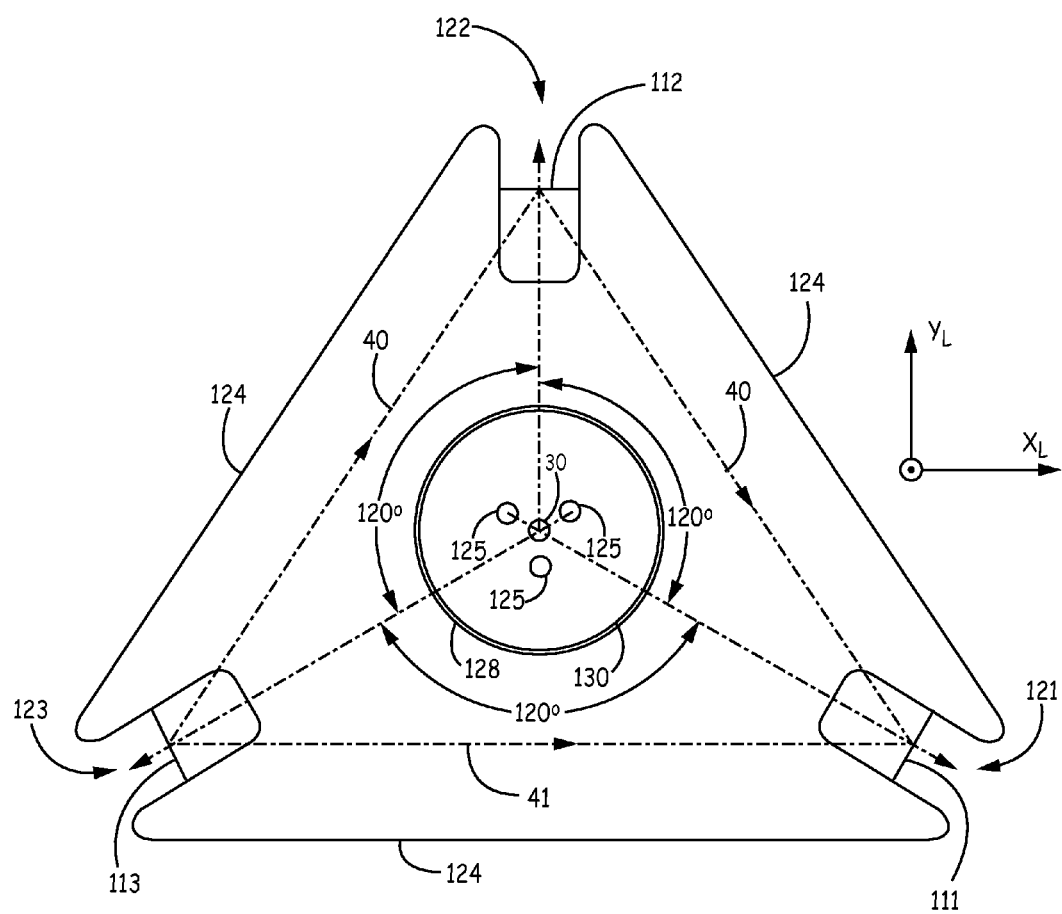
FIG. 4 is a top view of three reflectors and a ring-laser-gyro mounting feature of the ring laser gyroscope in accordance with the teachings of the present application.
Figure 5:
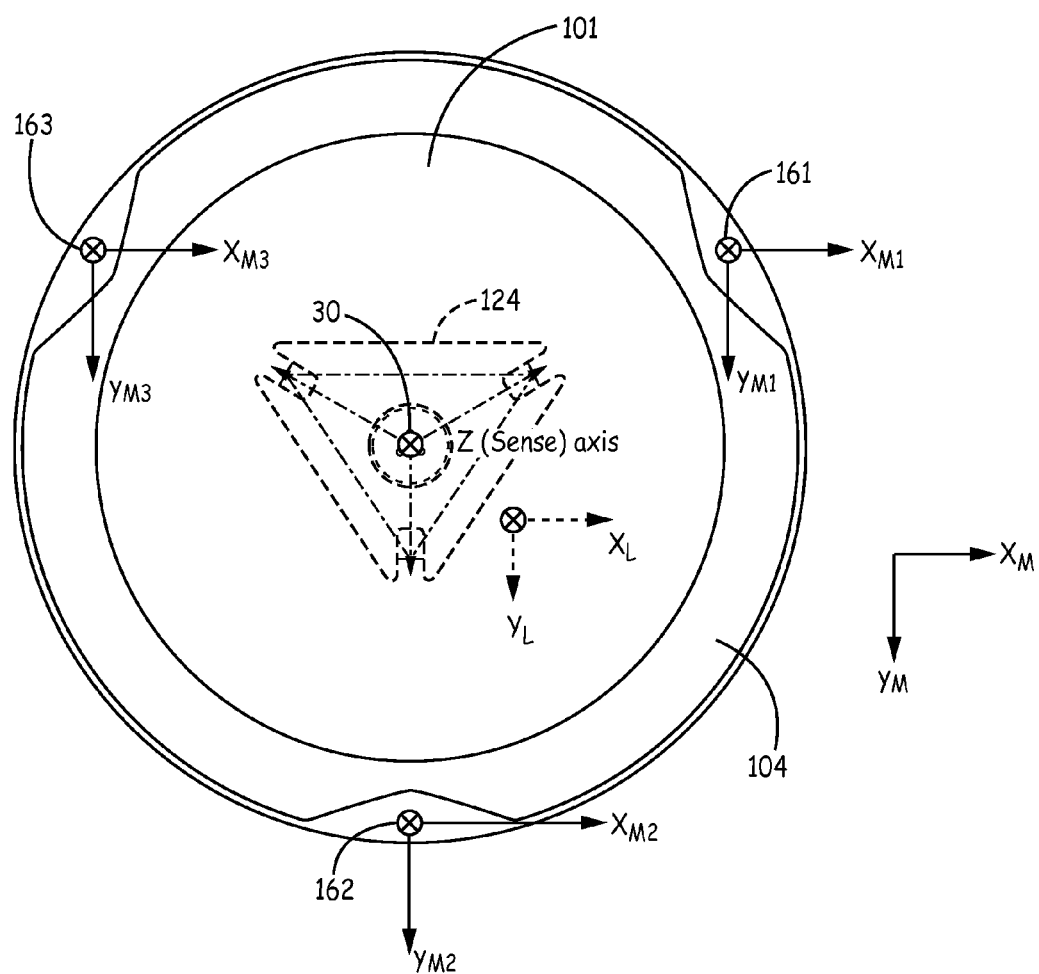
FIG. 5 is a bottom view of the gyro housing of the ring laser gyroscope of FIG. 1A.

A single-sense-axis ring laser gyroscope is now described with reference to FIGS. 1A-5. FIG. 1A is a cross-sectional view of an embodiment of a single axis ring laser gyroscope 10 configured to reduce alignment shifts between a lasing plane ($X_L$, $Y_L$) in the ring laser gyroscope 10 and a reference mounting plane ($X_M$, $Y_M$) in a gyro frame 100 in accordance with the present application. FIG. 1B is a side view of the minimally-threaded screw 50 to reduce alignment shifts in at least one critical angle in a ring laser gyroscope 10 in accordance with the teachings of the present application. FIG. 2A is an enlarged cross-sectional view of a minimally-threaded screw 50-2 in the ring laser gyroscope 10 in accordance with the teachings of the present application. FIG. 2A shows a screw 50-2 inserted through the ring-laser-gyro mounting feature 130 attached to the gyro frame 100 (also referred to herein as a "gyro housing 100") in embodiments of the present application as shown in FIG. 5. FIG. 2B is an enlarged cross-sectional view of a through hole 125 in the ring laser gyroscope 10 in accordance with the teachings of the present application. FIG. 3 is an oblique view of the ring laser gyroscope 10 of FIG. 1A with a top cover 105 removed. FIG. 4 is a top view of three reflectors 111, 112, and 113 and a ring-laser-gyro mounting feature 130 of the ring laser gyroscope 10 in accordance with the teachings of the present application. FIG. 5 is a bottom view of the gyro frame 100 of the ring-laser-gyroscope of FIG. 1A. The gyro frame 100 includes a reference mounting plane, which may be surface that lies in the reference mounting plane. The exemplary gyro frame 100 is a gyro housing 100 that is circular in shape. The housing can be other shapes that are suited to the vehicle that houses the ring laser gyroscope 10. The ring laser gyroscope 10 reduces alignment shifts in at least one critical alignment of the ring laser gyroscope 10. In the following description of the ring laser gyroscope 10 with reference to FIGS. 1A-5, the terms "gyro frame 100" and "gyro housing 100" are used interchangeably.

As shown in FIGS. 1A, 3, 4, and 5, the ring laser gyroscope 10 includes reflective components 111-113, a ring-laser-gyro mounting feature 130 with at least one through hole 125 and at least one minimally-threaded screw 50 positioned in the at least one through hole 125. As shown in FIG. 1B, the minimally-threaded screw 50 includes a screw head 51, an unthreaded-section 52, and a threaded-end 53 at a distal end of the minimally-threaded screw 50. The unthreaded-section 52 is between the screw head 51 and the threaded-end 53 and is about the length of a through hole 125 in the ring-laser-gyro mounting feature 130. The length of the minimally-threaded screw 50 has an axis 55. The threaded-end 53 of the minimally-threaded screw 50 is threaded in a threaded hole 110 (FIGS. 2A and 2B) in a gyro housing 100. The unthreaded-section 52 (FIG. 1B) of the minimally-threaded screw 50 is contactlessly encased in the at least one through hole 125 (FIGS. 1A and 2A). Then the minimally-threaded screw 50 is contactlessly encased in the at least one through hole 125, the axis 55 of the minimally-threaded screw 50 when it is contactlessly encased in the at least one through hole 125 is parallel to the sense axis 30 (FIG. 1A) of the ring laser gyroscope 10. As shown in FIG. 1B, a first minimally-threaded screw 50-1 has a first axis 55-1 that is parallel to the sense axis 30 and a second minimally-threaded screw 50-2 has a second axis 55-2 that is also parallel to the sense axis 30.

The reflective components 111-113 are aligned with reference to each other in order to direct clockwise optical beams 40 (FIG. 4) and counter-clockwise optical beams 41 (FIG. 4) in a lasing plane ($X_L$, $Y_L$). In this illustrated embodiment, the reflective components 111-113 are held in a glass substrate 124. The top and bottom surfaces of the glass substrate 124 are rectangular in shape with a centrally located through hole 128. Cavities 121, 122, and 123 are etched or drilled in three corners of the glass substrate 124 to hold the three respective reflective components 111-113. The ring-laser-gyro mounting feature 130 is positioned within or adjacent to the centrally located through hole 128. The ring-laser-gyro mounting feature 130 included three through holes represented generally at 125.

In one implementation of this embodiment, the ring-laser-gyro mounting feature 130 is a gyro motor 130 positioned within the centrally located through hole 128. In another implementation of this embodiment, the ring-laser-gyro mounting feature 130 is a glass plug 130 that fills the through hole 128. FIG. 4 shows a slight gap between the ring-laser-gyro mounting feature 130 and the through hole 128 centrally located in the glass substrate 124 in order to clearly distinguish between the ring-laser-gyro mounting feature 130 and the through hole 128. However, the gap is only illustrative and there is no gap between the ring-laser-gyro mounting feature 130 and the through hole 128 when the ring-laser-gyro mounting feature 130 is a gyro motor 130 or a plug 130. In yet another implementation of this embodiment, there is no centrally located through hole 128 in the glass substrate 124 and the at least one at least one through hole 125 is centrally located in the glass substrate 124.

In yet another implementation of this embodiment, the ring-laser-gyro mounting feature 130 does not fill the through hole 128 centrally located in the glass substrate 124. For example, the ring-laser-gyro mounting feature 130 can be a mounting frame 130, which is configured to hold the glass substrate 124 in the gyro frame 100. In this case, the mounting frame 130 is positioned adjacent to or partially within the centrally located through hole 128. In one implementation of this embodiment, the mounting frame 130 replaces the gyro housing 100 and in that case, the reference mounting plane is a plane within the mounting frame 130 as is understandable to one skilled in the art.

As shown in FIG. 4, the first reflective component 111 has a reflective surface that is: 1) perpendicular to the lasing plane ($X_L$, $Y_L$); 2) 120° with reference to the reflective surface of the second reflective component 112; and 2) 120° with reference to the reflective surface of the third reflective component 113. Likewise, the second reflective component 112 has a reflective surface that is: 1) perpendicular to the lasing plane ($X_L$, $Y_L$); and 2) 120° with reference to the reflective surface of the third reflective component 113. The third reflective component 113 has a reflective surface that is perpendicular to the lasing plane ($X_L$, $Y_L$).

In one implementation of this embodiment, the ring laser gyroscope includes four reflective components are aligned with reference to each other in order to direct clockwise optical beams and counter-clockwise optical beams in a lasing plane ($X_L$, $Y_L$). In this latter embodiment, the reflective surfaces of the pairs of reflective components are arranged at 90° or 180° with respect to each other. In this latter embodiment, the top and bottom surfaces of the glass substrate are square in shape with a centrally located through hole and four cavities are etched or drilled into the four corners of the glass substrate 124 to hold four respective reflective components.

The ring-laser-gyro mounting feature 130 has at least one through hole 125 (FIG. 2A). The minimally-threaded screw 50 is positioned in the through hole 125 and the threaded-end 53 of the minimally-threaded screw 50 is threaded in the threaded hole 110 in the gyro housing 100. The through hole 125 has a larger diameter than the diameter of the unthreaded-section 52 of the minimally-threaded screw 50 so, when the minimally-threaded screw 50 is attached to the gyro housing 100, the unthreaded-section 52 of the minimally-threaded screw 50 is contactlessly encased in the at least one through hole 125.

As shown in FIGS. 1A, 2A, and 2B, the gyro housing 100 includes at least one threaded hole 110 that is configured to accept the threaded-end 53 of the minimally-threaded screw 50. In the embodiments of the ring laser gyroscope 10 shown in FIGS. 1A-5, the ring laser gyroscope 10 includes three through holes 125 and the gyro housing 100 includes three threaded holes 110 and three respective screws 50-1, 50-2, and 50-3 are positioned in the three respective through holes 125 in the ring-laser-gyro mounting feature 130. When each of the three minimally-threaded screws 50-1, 50-2, and 50-3 is threaded in a respective one of the three threaded holes 110 in the gyro housing 100, the three unthreaded-sections 52 of the three minimally-threaded screws 50-1, 50-2, and 50-3 are contactlessly encased in respective ones of the three through holes 125.

As shown in FIGS. 1A, 3, 4, and 5, the ring laser gyroscope 10 has a single sense axis 30 that is perpendicular to the lasing plane ($X_L$, $Y_L$) shown in FIG. 4. Specifically, the lasing plane ($X_L$, $Y_L$) is spanned by the orthogonal axes $X_L$ and $Y_L$. As shown in FIG. 3, the screw heads 51-1, 51-2, and 52-3 of minimally-threaded screws 50-1, 50-2, and 50-3 are visible and each of the minimally-threaded screws 50-1, 50-2, and 50-3 has a respective axis 55-1, 55-2, and 55-3 that is parallel to the sense axis 30. As shown in FIG. 5, the reference mounting plane ($X_M$, $Y_M$) is spanned by the orthogonal axes $X_M$ and $Y_M$ and includes the three points 161, 162, and 163. The first point 161 is at the origin (0, 0) of the axes ($X_{M1}$, $Y_{M1}$), the second point 162 is at the origin (0, 0) of the axes ($X_{M2}$, $Y_{M2}$), and the third point 163 is at the origin (0, 0) of the axes ($X_{M3}$, $Y_{M3}$). The three points 161, 162, and 163 are those points in the gyro housing 100 which contact a surface to which the ring laser gyroscope 10 is attached when preparing to operate the ring laser gyroscope 10.

The critical alignment for the ring laser gyroscope 10 is the angular relationship between the lasing plane ($X_L$, $Y_L$) in the ring laser gyroscope 10 and the reference mounting plane ($X_M$, $Y_M$). In one implementation of this embodiment, the reference mounting plane is in a surface of the gyro housing 100. The ring laser gyroscope 10 functions to measure the orientation of a moving vehicle. When the ring laser gyroscope 10 is mounted in a vehicle (not shown) prior to movement, the ring laser gyroscope 10 is calibrated based on the relative orientation of the lasing plane ($X_L$, $Y_L$) in the ring laser gyroscope 10 and the reference mounting plane ($X_M$, $Y_M$). The relative orientation of the lasing plane ($X_L$, $Y_L$) in the ring laser gyroscope 10 and the reference mounting plane ($X_M$, $Y_M$) is referred to herein as an "angular relationship between the lasing plane ($X_L$, $Y_L$) in the ring laser gyroscope 10 and the reference mounting plane ($X_M$, $Y_M$) in the gyro housing 100". In some systems that implement the ring-laser-gyroscope 10, the ring laser gyroscope 10 cannot be recalibrated while the ring laser gyroscope 10 is operational in a moving vehicle. If there are temperature changes in the vehicle or if mechanical stresses on the ring laser gyroscope 10 change while the ring laser gyroscope 10 is operational in the moving vehicle, the minimally-threaded screw 50 does not have any unintentional contact with the through hole 125 in the ring-laser-gyro mounting feature 130. Thus, the critical alignment between the lasing plane ($X_L, Y_L$) and the reference mounting plane ($X_M, Y_M$) does not change due to unintentional contact between the minimally-threaded screw 50 and the through hole 125. In this manner, the ring laser gyroscope 10 is configured to reduce alignment shifts in the one critical alignment between the lasing plane ($X_L, Y_L$) and the reference mounting plane ($X_M, Y_M$) of the ring laser gyroscope 10.

A multi-axis ring laser gyroscope 13 is now described with reference to FIGS. 1B, 2A, 2B, 4, and 6A-6C. As defined herein a multi-axis ring laser gyroscope is a ring laser gyroscope with multiple sense axes. The multiple-axis ring laser gyroscope 13 is also referred to herein as a "triad gyro 13" when the ring laser gyroscope has three sense axes. In this case, the critical alignment for the triad gyro 13 is the alignment among the three sense axes. The critical alignment for the triad gyro 13 is maintained by the minimally-threaded screws 50.

Figure 6A:
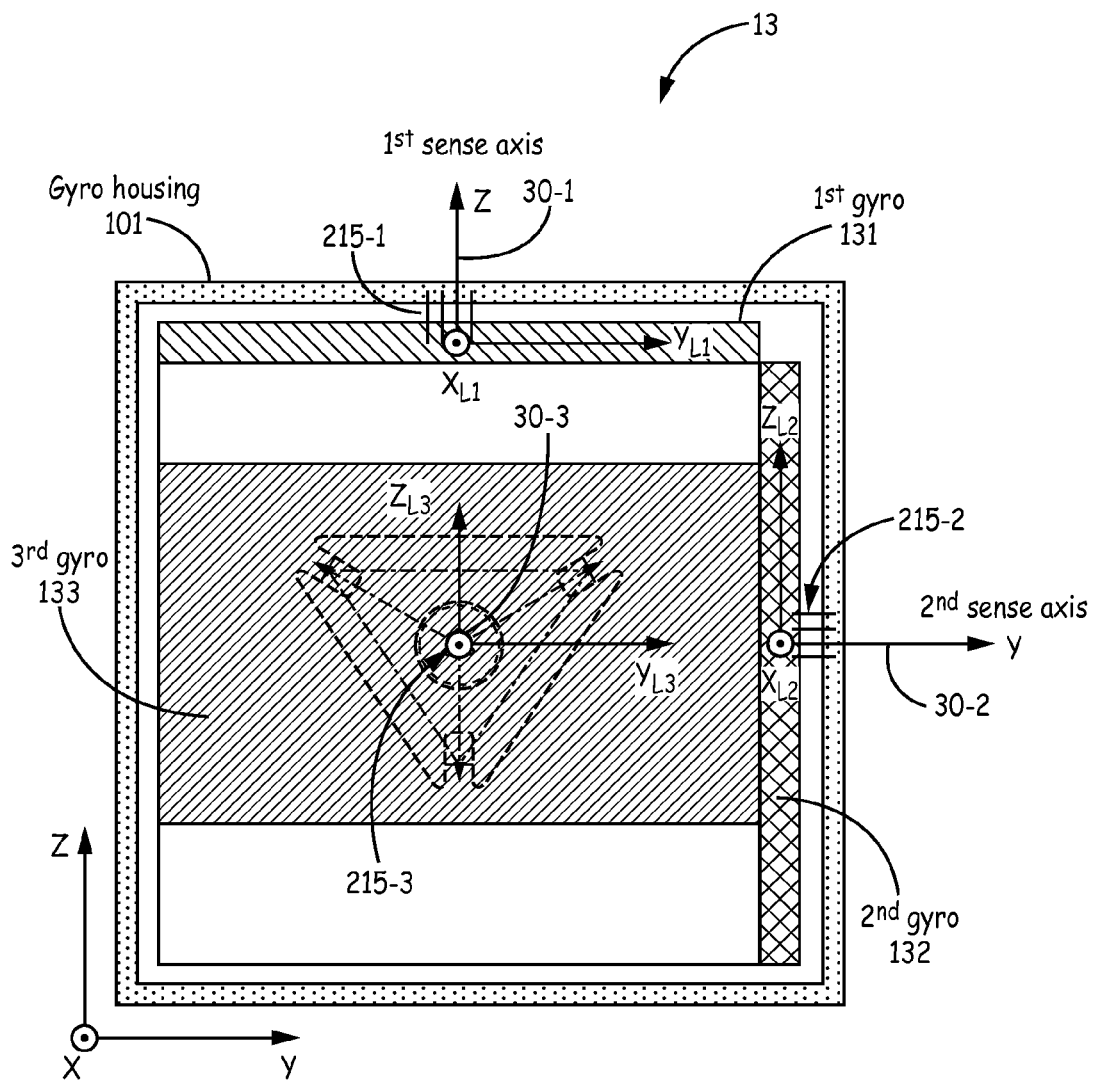
FIG. 6A is a top view of an embodiment of a multiple-axis ring laser gyroscope configured to reduce alignment shifts between multiple-sense axes in accordance with the present application.
Figure 6B:
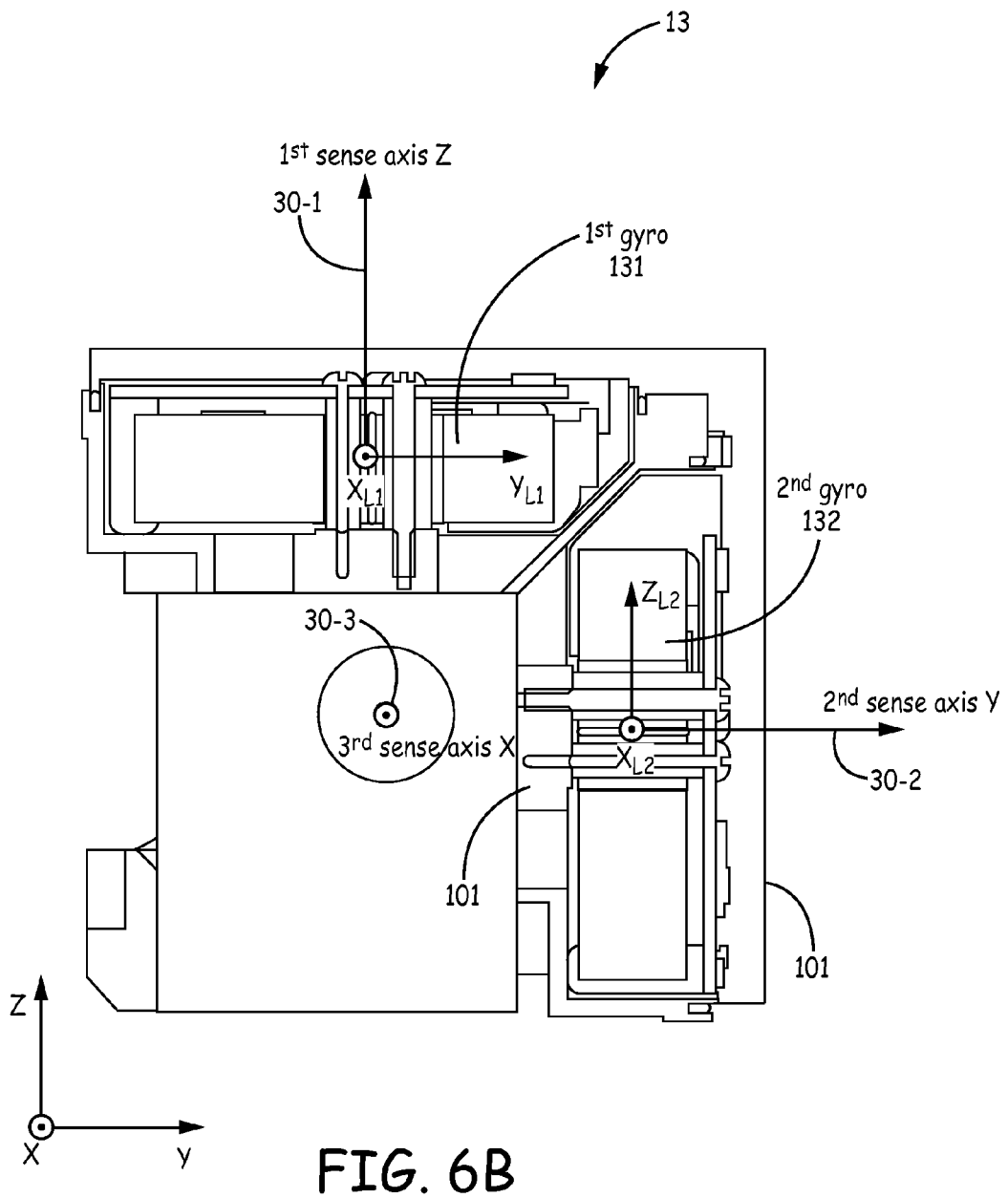
FIG. 6B is a first cross-sectional view of an embodiment of a multiple-axis ring laser gyroscope configured to reduce alignment shifts between multiple-sense axes in accordance with the present application.
Figure 6C:
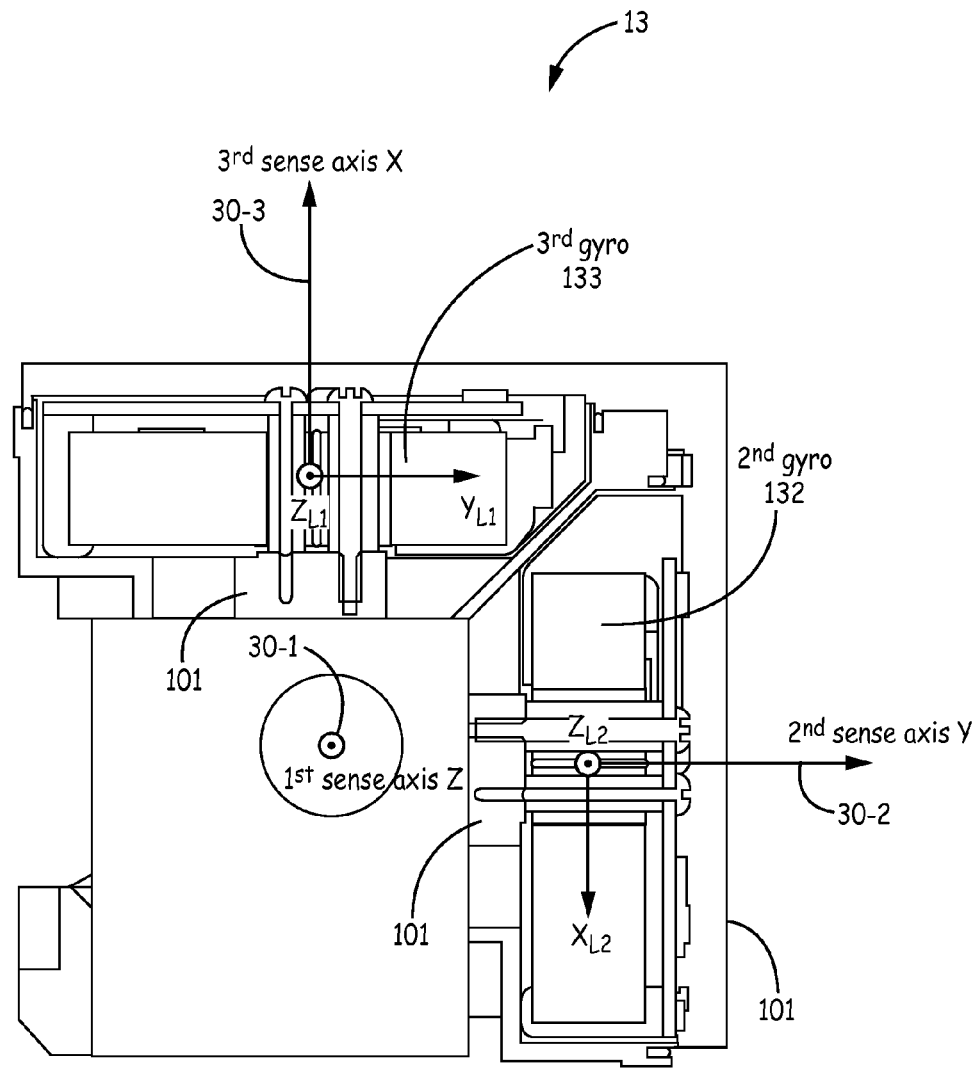
FIG. 6C is a second cross-sectional view of an embodiment of a multiple-axis ring laser gyroscope configured to reduce alignment shifts between multiple-sense axes in accordance with the present application.

The multi-axis ring laser gyroscope 13 shown in FIGS. 6A-6C reduces alignment shifts between respective multiple sense axes of the multi-axis ring laser gyroscope 13. The multi-axis ring laser gyroscope 13 includes three ring laser gyroscopes 131, 132, and 133. The three ring laser gyroscopes 131, 132, and 133 are similar in function to the ring laser gyroscope 10 shown in FIG. 1A. Output from the three mutually-orthogonal ring laser gyroscopes 131, 132, and 133 is processed by a processor (not shown) to determine the orientation in three dimensions of a moving vehicle that houses the multi-axis ring laser gyroscope 13. Specifically, the orientation in three dimensions is determined based on output from the mutually-orthogonally arranged ring laser gyroscopes 131, 132, and 133. The following discussion refers to a first ring-laser-gyro mounting feature 131 as a first gyro motor 131, a second ring-laser-gyro mounting feature 132 as a second ring-laser-gyro motor 132, and a third ring-laser-gyro mounting feature 133 as a second ring-laser-gyro motor 133. However, this is exemplary and the first, second, and third ring-laser-gyro mounting features 131, 132, and 133 can be plugs, mounting frames, or an integral portion of the glass substrate 124 configured hold the reflective components as described above. The following discussion refers to a gyro frame 101 as a gyro housing 101 although other types of frames can be implemented.

The multi-axis ring laser gyroscope 13 includes a first set of reflective components 111-113 (FIG. 4), a first ring-laser-gyro motor 131 having a first set of through holes 125, a first set of minimally-threaded screws 50 (FIG. 1B) positioned in the first set of through holes 125, a second set of reflective components 111-113 (FIG. 4), a second ring-laser-gyro motor 132 having a second set of through holes 125, and a second set of minimally-threaded screws 50 (FIG. 1B) positioned in the second set of through holes 125, a third set of reflective components 111-113 (FIG. 4), a third ring-laser-gyro motor 133 having a third set of through holes 125, and a third set of minimally-threaded screws 50 (FIG. 1B) positioned in the third set of through holes 125. The gyro housing 101 includes a first set of threaded holes 110, a second set of threaded holes 110, and a third set of threaded holes 110 (FIG. 2A).

Each set of through holes 125 includes at least one through hole 125 and each set of minimally-threaded screws 50 includes a respective at least one minimally-threaded screw 50. As shown in FIG. 6A, the first set of minimally-threaded screws 215-1 includes three screws 50 that are similar in structure and function to the screw 50 shown in FIG. 1B. Similarly, the second set of minimally-threaded screws 215-2 (FIG. 6A) includes three screws 50 and the third set of minimally-threaded screw 215-3 (FIG. 6A) includes three screw 50.

The first set of reflective components 111-113 (FIG. 4) direct clockwise optical beams 40 and counter-clockwise optical beams 41 in a first lasing plane ($X_{L1}, Y_{L1}$) that is perpendicular to a first sense axis 30-1. The second set of reflective components 111-113 (FIG. 4) direct clockwise optical beams 40 and counter-clockwise optical beams 41 in a second lasing plane ($X_{L2}, Y_{L2}$). The second lasing plane ($X_{L2}, Y_{L2}$) is perpendicular to the first lasing plane ($X_{L1}, Y_{L1}$) and the second lasing plane ($X_{L2}, Y_{L2}$) is perpendicular to a second sense axis 30-2. The third set of reflective components 111-113 (FIG. 4) direct clockwise optical beams 40 and counter-clockwise optical beams 41 in a third lasing plane ($X_{L3}, Y_{L3}$). The third lasing plane ($X_{L3}, Y_{L3}$) is perpendicular to a third sense axis 30-3 (FIG. 6A). The third lasing plane ($X_{L3}, Y_{L3}$) is perpendicular to the first lasing plane ($X_{L1}, Y_{L1}$) and is also perpendicular to the second lasing plane ($X_{L2}, Y_{L2}$).

The first set of minimally-threaded screws 50 is positioned in the first set of through holes 125. The threaded-ends 53 of the minimally-threaded screws 50 in the first set 215-1 of minimally-threaded screws 50 are threaded in a first set of threaded holes 110 in a gyro housing 101 to fixedly attach the first ring-laser-gyro motor 131 to the gyro housing 101. The unthreaded-sections 52 of the minimally-threaded screws 50 in the first set 215-1 of minimally-threaded screws 50 are contactlessly encased in the first set of through holes 125.

The second set 215-2 of minimally-threaded screws 50 is positioned in the second set of through holes 125. The threaded-ends 53 of the minimally-threaded screws 50 in the second set 215-2 of minimally-threaded screws 50 are threaded in a second set of threaded holes 110 in the gyro housing 101 to fixedly attach the second ring-laser-gyro motor 132 to the gyro housing 101. The unthreaded-sections 52 of the minimally-threaded screws 50 in the second set 215-2 of minimally-threaded screws 50 are contactlessly encased in the second set of through holes 125.

The third set 215-3 of minimally-threaded screws 50 is positioned in the third set of through holes 125. The threaded-ends 53 of the minimally-threaded screws 50 in the third set 215-3 of minimally-threaded screws 50 are threaded in a third set of threaded holes 110 in the gyro housing 101 to fixedly attach the third ring-laser-gyro motor 133 to the gyro housing 101. The unthreaded-sections 52 of the minimally-threaded screws 50 in the third set 215-3 of minimally-threaded screws 50 are contactlessly encased in the third set of through holes 125.

In one implementation of this embodiment, at least one of the first set 215-1 of minimally-threaded screws 50, the second set 215-2 of minimally-threaded screws 50, and the third set 215-3 of minimally-threaded screws 50 is a set comprising a single minimally-threaded screw 50.

In another implementation of this embodiment, the multi-axis ring laser gyroscope 13 includes two ring laser gyroscopes 131 and 132. In this embodiment, the ring laser gyroscope only includes a first lasing plane ($X_{L1}, Y_{L1}$) and a second lasing plane ($X_{L2}, Y_{L2}$) that are perpendicular to two respective sense axes 30-1 and 30-2. In this embodiment, the critical alignment is between the two sense axes 30-1 and 30-2. In this embodiment, the gyro housing 101 include a first set of threaded holes 110 and a second set of threaded holes 110. In another implementation of this latter embodiment, at least one of the first set of minimally-threaded screws 50 and the second set of minimally-threaded screw 50 is a set comprising a single minimally-threaded screw 50.

Figure 7:
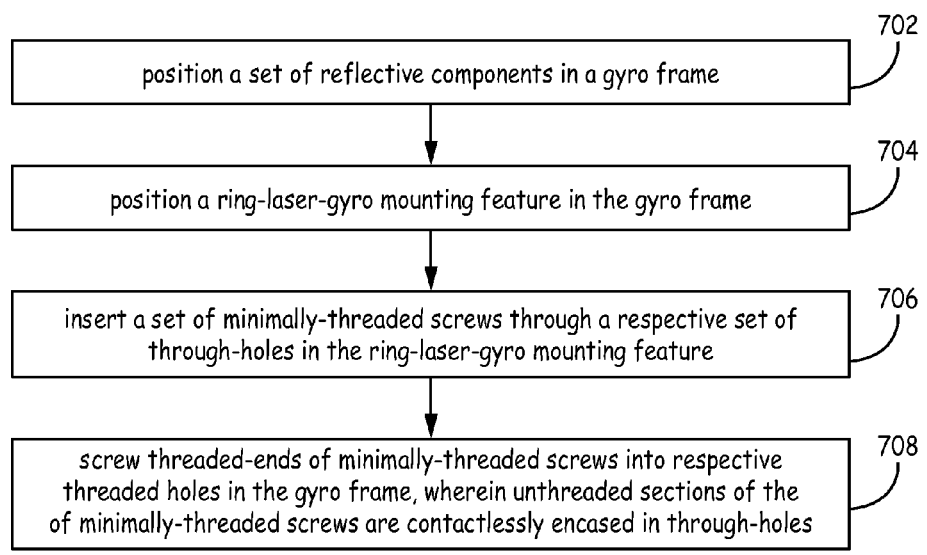
FIG. 7 is a flow chart showing an embodiment of a method to reduce alignment shifts in at least one critical alignment of a ring laser gyroscope.
Figures 8A, 8B:
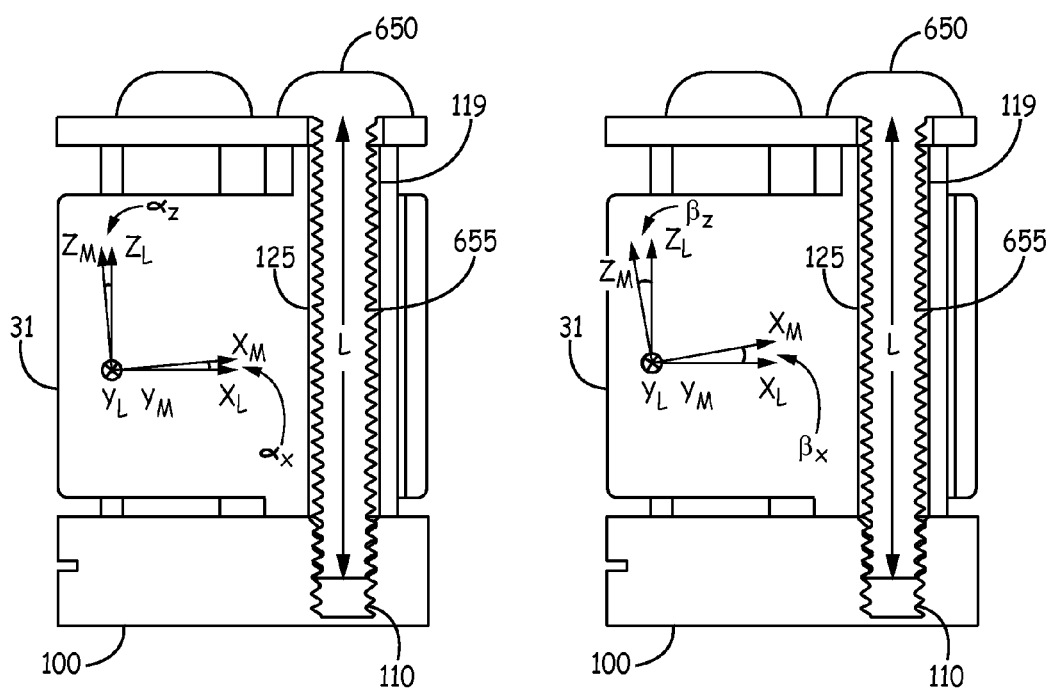
FIGS. 8A and 8B show a prior art screw inserted through the gyro mounting feature attached to the gyro frame at a first temperature and a second temperature, respectively.

FIG. 7 is a flow chart showing an embodiment of a method 700 to reduce alignment shifts in at least one critical alignment of a ring laser gyroscope. In one implementation of this embodiment of method 700, the ring laser gyroscope is the ring laser gyroscope shown in FIG. 1A, and the critical alignment is the angular relationship between a lasing plane in the ring laser gyroscope and a reference mounting plane in a gyro housing.

In another implementation of this embodiment of method 700, the ring laser gyroscope is the ring laser gyroscope 13 shown in FIGS. 6A-6C and the critical alignment is between pairs of the sense axes 30-1, 30-2, and 30-3. In this latter case, a critical alignment between a first pair of sense axes is the perpendicular alignment between the first sense axis 30-1 and the second sense axis 30-2. Likewise, a critical alignment between a second pair of sense axes is the perpendicular alignment between the second sense axis 30-2 and the third sense axis 30-3. And the critical alignment between a third pair of sense axes is the perpendicular alignment between the third sense axis 30-3 and the first sense axis 30-1.

At block 702, at least one set of reflective components is positioned in a gyro frame 100. The at least one set of reflective components 111-113 (FIG. 4) is configured to direct clockwise optical beams 40 and counter-clockwise optical beams 41 in at least one respective lasing plane $(X_L, Y_L)$. In one implementation of this embodiment, the gyro frame is a gyro housing. In this embodiment, one set of reflective components is positioned in the gyro housing 100 to direct the clockwise optical beams 40 and the counter-clockwise optical beams 41 in one lasing plane. In this embodiment, the critical alignment is the angular relationship between the lasing plane $(X_L, Y_L)$ in the ring laser gyroscope 10 and a reference mounting plane $(X_M, Y_M)$ in the gyro housing 100.

In another implementation of this embodiment, three sets of reflective components 111-113 (FIG. 4) are positioned in a gyro housing 100 to direct clockwise optical beams 40 and counter-clockwise optical beams 41 in three respective lasing planes $(X_{L1}, Y_{L1})$, $(X_{L2}, Y_{L2})$, and $(X_{L3}, Y_{L3})$. A first lasing plane $(X_{L1}, Y_{L1})$ is perpendicular to a first sense axis 30-1. A second lasing plane $(X_{L2}, Y_{L2})$ is perpendicular to a second sense axis 30-2 and perpendicular to the first lasing plane $(X_{L1}, Y_{L1})$. A third lasing plane $(X_{L3}, Y_{L3})$ is perpendicular to a third sense axis 30-3 and is perpendicular to the first lasing plane $(X_{L1}, Y_{L1})$ and the second lasing plane $(X_{L2}, Y_{L2})$. The critical alignment in this embodiment is between the pairs of the sense axes 30-1, 30-2, and 30-3.

At block 704, at least one ring-laser-gyro mounting feature 130 is positioned in the gyro frame 100. In one implementation of this embodiment, one ring-laser-gyroscope motor 130 is positioned in a gyro housing 100. In another implementation of this embodiment, three ring laser gyroscopes 131, 132, and 133 are mutually orthogonally arranged in a gyro housing 101.

At block 706, at least one set of minimally-threaded screws 50 is inserted through at least one respective set of through holes 125 in the at least one ring-laser-gyro motor 130.

At block 708, threaded-ends 53 of minimally-threaded screws 50 are screwed into respective threaded holes in the gyro housing 100 to attach the at least one ring-laser-gyro mounting feature 130 to the gyro frame 100. The unthreaded-sections 52 of the minimally-threaded screws 50 in the at least one set of minimally-threaded screws 50 are contactlessly encased in through holes 125 in the at least one respective set of through holes 125.

In one implementation of this embodiment, in which the ring laser gyroscope is a multi-axis ring laser gyroscope 13, block 708 is implemented as follows: 1) threaded-ends 53 of first minimally-threaded screws 50 in the first set of minimally-threaded screws 50 are screwed into first threaded holes in the gyro housing 100 to attach the first ring-laser-gyro motor 131 to the gyro housing 101, so that unthreaded-sections 52 of the minimally-threaded screws 50 in the first set of minimally-threaded screws 50 are contactlessly encased in first through holes 125 in the first set of through holes 125; 2) the threaded-ends 53 of second minimally-threaded screws 50 are screwed in the second set of minimally-threaded screws 50 into second threaded holes in the gyro housing 101 to attach the second ring-laser-gyro motor 132 to the gyro housing 101 so the unthreaded-sections 52 of the minimally-threaded screws 50 in the second set of minimally-threaded screws 50 are contactlessly encased in second through holes 125 in the second set of through holes 125; and 3) threaded-ends 53 of third minimally-threaded screws 50 are screwed in the third set of minimally-threaded screws 50 into third threaded holes in the gyro housing 100 to attach the third ring-laser-gyro motor 133 to the gyro housing 100, so unthreaded-sections 52 of the minimally-threaded screws 50 in the third set of minimally-threaded screws 50 are contactlessly encased in third through holes 125 in the third set of through holes 125.

EXAMPLE EMBODIMENTS

Example 1 includes a ring laser gyroscope configured to reduce alignment shifts in at least one critical alignment of the ring laser gyroscope, the ring laser gyroscope comprising: reflective components configured to direct clockwise optical beams and counter-clockwise optical beams in at least one lasing plane; at least one ring-laser-gyro mounting feature having at least one respective through hole; and at least one minimally-threaded screw positioned in the at least one respective through hole, wherein an unthreaded section of the minimally-threaded screw is contactlessly encased in the at least one respective through hole, and wherein a threaded-end of the at least one minimally-threaded screw is threaded in a respective at least one threaded hole in a gyro frame, the gyro frame spanning a reference mounting plane.

Example 2 includes the ring laser gyroscope of Example 1, wherein the at least one lasing plane is a single lasing plane the ring laser gyroscope, and wherein the at least one ring-laser-gyro mounting feature is a gyro motor including the at least one respective through hole, wherein the critical alignment is between the single lasing plane in the ring laser gyroscope and the reference mounting plane.

Example 3 includes the ring laser gyroscope of any of Examples 1-2, wherein the at least one respective through hole includes three through holes, wherein the at least one minimally-threaded screw positioned in the at least one respective through hole includes three minimally-threaded screws positioned in three respective through holes in the at least one ring-laser-gyro mounting feature.

Example 4 includes the ring laser gyroscope of any of Examples 1-3, wherein the at least one lasing plane is a single lasing plane the ring laser gyroscope, wherein the at least one ring-laser-gyro mounting feature is a plug including the at least one respective through hole, wherein the critical alignment is between the single lasing plane in the ring laser gyroscope and the reference mounting plane.

Example 5 includes the ring laser gyroscope of any of Examples 1-4, wherein the gyro frame is a gyro housing.

Example 6 includes the ring laser gyroscope of any of Examples 1-5, wherein the gyro frame is a gyro housing, wherein at least one minimally-threaded screw includes three minimally-threaded screws and the at least one threaded hole in the gyro frame includes three threaded holes in the gyro housing, wherein each of the three minimally-threaded screws is threaded in a respective one of the three threaded holes in the gyro housing, wherein the three unthreaded sections of the three minimally-threaded screws are contactlessly encased in respective ones of the three through holes.

Example 7 includes the ring laser gyroscope of any of Examples 1-6, wherein the ring laser gyroscope is a multi-axis ring laser gyroscope, wherein at least one lasing plane is three mutually orthogonal lasing planes, wherein the at least one critical angular relationship is the angular relationship between a first sense axis and a second sense axis, between the second sense axis and a third sense axis, and between third sense axis and the first sense axis.

Example 8 includes the ring laser gyroscope of Example 7, wherein the reflective components comprise: a first set of reflective components; a second set of reflective components; and a third set of reflective components; wherein the at least one ring-laser-gyro mounting feature comprises: a first ring-laser-gyro mounting feature having a first set of through holes for a first set of minimally-threaded screws; a second ring-laser-gyro mounting feature having a second set of through holes for a second set of minimally-threaded screws; and a third ring-laser-gyro mounting feature having a third set of through holes for a third set of minimally-threaded screws Example 9 includes a multi-axis ring laser gyroscope configured to reduce alignment shifts between respective multiple sense axes of the multi-axis ring laser gyroscope, the ring laser gyroscope comprising: a first set of reflective components configured to direct clockwise optical beams and counter-clockwise optical beams in a first lasing plane, the first lasing plane perpendicular to a first sense axis; a first ring-laser-gyro mounting feature having a first set of through holes including at least one through hole; a first set of minimally-threaded screws positioned in the first set of through holes, wherein unthreaded sections of the minimally-threaded screws in the first set of minimally-threaded screws are contactlessly encased in the first set of through holes, and wherein threaded-ends of minimally-threaded screws in the first set of minimally-threaded screws are threaded in a first set of threaded holes in a gyro frame to fixedly attach the first ring-laser-gyro mounting feature to the gyro frame, a second set of reflective components configured to direct clockwise optical beams and counter-clockwise optical beams in a second lasing plane, the second lasing plane being perpendicular to the first lasing plane, and the second lasing plane perpendicular to a second sense axis; a second ring-laser-gyro mounting feature having a second set of through holes including at least one through hole; and a second set of minimally-threaded screws positioned in the second set of through holes, wherein unthreaded sections of the minimally-threaded screws in the second set of minimally-threaded screws are contactlessly encased in the second set of through holes, and wherein threaded-ends of minimally-threaded screws in the second set of minimally-threaded screws are threaded in a second set of threaded holes in the gyro frame to fixedly attach the second ring-laser-gyro mounting feature to the gyro frame.

Example 10 includes the multi-axis ring laser gyroscope of Example 9, further comprising: a third set of reflective components configured to direct clockwise optical beams and counter-clockwise optical beams in a third lasing plane, the third lasing plane perpendicular to a third sense axis, the third lasing plane being perpendicular to the first lasing plane and being perpendicular to the second lasing plane; a third ring-laser-gyro mounting feature having a third set of through holes including at least one through hole; and a third set of minimally-threaded screws positioned in the third set of through holes, wherein unthreaded sections of the minimally-threaded screws in the third set of minimally-threaded screws are contactlessly encased in the third set of through holes, and wherein threaded-ends of minimally-threaded screws in the third set of minimally-threaded screws are threaded in a third set of threaded holes in the gyro frame to fixedly attach the third ring-laser-gyro mounting feature to the gyro frame.

Example 11 includes the multi-axis ring laser gyroscope of Example 10, wherein the gyro frame is a gyro housing, the multi-axis ring laser gyroscope further comprising: the gyro housing including the first set of threaded holes, the second set of threaded holes, and the third set of threaded holes.

Example 12 includes the multi-axis ring laser gyroscope of any of Examples 9-11, further comprising: the gyro frame including the first set of threaded holes and the second set of threaded holes.

Example 13 includes the multi-axis ring laser gyroscope of Example 9 wherein the gyro frame is a gyro housing.

Example 14 includes the multi-axis ring laser gyroscope of Example 9, wherein at least one of the first set of minimally-threaded screws and the second set of minimally-threaded is a set comprising a single minimally-threaded screw.

Example 15 includes a method to reduce alignment shifts in at least one critical alignment of a ring laser gyroscope, the method comprising: positioning at least one set of reflective components in a gyro frame, the at least one set of reflective components configured to direct clockwise optical beams and counter-clockwise optical beams in at least one respective lasing plane; positioning at least one ring-laser-gyro mounting feature in the gyro frame; and inserting at least one set of minimally-threaded screws through at least one respective set of through holes in the at least one ring-laser-gyro mounting feature; and screwing threaded-ends of minimally-threaded screws in the at least one set of minimally-threaded screws into respective threaded holes in the gyro frame to attach the at least one ring-laser-gyro mounting feature to the gyro frame, wherein unthreaded sections of the minimally-threaded screws in the at least one set of minimally-threaded screws are contactlessly encased in through holes in the at least one respective set of through holes.

Example 16 includes the method of Example 15, wherein positioning the at least one set of reflective components in the gyro frame comprises positioning one set of reflective components in a gyro housing, the one set of reflective components configured to direct the clockwise optical beams and the counter-clockwise optical beams in a single lasing plane, wherein positioning the at least one ring-laser-gyro mounting feature in the gyro frame comprises positioning a single ring-laser-gyro mounting feature in the gyro housing; and wherein inserting the at least one set of minimally-threaded screws through the at least one respective set of through holes comprises inserting a single set of minimally-threaded screws through a single set of through holes, the method further comprising: positioning the gyro housing on three mounting points that span a reference mounting plane, wherein the critical alignment of the ring laser gyroscope is an initial angular relationship between the single lasing plane in the ring laser gyroscope and the reference mounting plane.

Example 17 includes the method of Example 15, wherein positioning the at least one set of reflective components in the gyro frame comprises: positioning a first set of reflective components in a gyro housing, the first set of reflective components configured to direct clockwise optical beams and counter-clockwise optical beams in a first lasing plane, the first lasing plane being perpendicular to a first sense axis; and positioning a second set of reflective components in the gyro housing, the second set of reflective components configured to direct clockwise optical beams and counter-clockwise optical beams in a second lasing plane, the second lasing plane being perpendicular to a second sense axis, and the second lasing plane being perpendicular to the first lasing plane, wherein positioning the at least one ring-laser-gyro mounting feature in the gyro housing comprises: positioning a first ring-laser-gyro mounting feature in the gyro housing; and positioning a second ring-laser-gyro mounting feature in the gyro housing; wherein the critical alignment is between the first sense axis and the second sense axis.

Example 18 includes the method of Example 17, wherein inserting the at least one set of minimally-threaded screws through the at least one respective set of through holes comprises: inserting a first set of minimally-threaded screws through a first set of through holes; and inserting a second set of minimally-threaded screws through a second set of through holes, wherein screwing threaded-ends of minimally-threaded screws in the at least one set of minimally-threaded screws into respective threaded holes in the gyro frame, comprises: screwing threaded-ends of first minimally-threaded screws in the first set of minimally-threaded screws into first threaded holes in the gyro housing to attach the first ring-laser-gyro mounting feature to the gyro housing, wherein unthreaded sections of the minimally-threaded screws in the first set of minimally-threaded screws are contactlessly encased in first through holes in the first set of through holes; and screwing threaded-ends of second minimally-threaded screws in the second set of minimally-threaded screws into second threaded holes in the gyro housing to attach the second ring-laser-gyro mounting feature to the gyro housing, wherein unthreaded sections of the minimally-threaded screws in the second set of minimally-threaded screws are contactlessly encased in second through holes in the second set of through holes.

Example 19 includes the method of Example 18, wherein positioning the at least one set of reflective components in the gyro housing further comprises: positioning a third set of reflective components in the gyro housing, the third set of reflective components configured to direct clockwise optical beams and counter-clockwise optical beams in a third lasing plane, the third lasing plane being perpendicular to a third sense axis, and the third lasing plane being perpendicular to the first lasing plane and the second lasing plane, wherein positioning the at least one ring-laser-gyro motor in the gyro housing further comprises: positioning a third ring-laser-gyro mounting feature in the gyro housing, wherein the critical alignment is between the first sense axis and the third sense axis and between the second sense axis and the third sense axis.

Example 20 includes the method of Example 19, wherein inserting the at least one set of minimally-threaded screws through the at least one respective set of through holes further comprises: inserting a third set of minimally-threaded screws through a third set of through holes; wherein screwing threaded-ends of minimally-threaded screws in the at least one set of minimally-threaded screws into respective threaded holes in the gyro, further comprises: screwing threaded-ends of third minimally-threaded screws in the third set of minimally-threaded screws into third threaded holes in the gyro housing to attach the third ring-laser-gyro mounting feature to the gyro housing, wherein unthreaded sections of the minimally-threaded screws in the third set of minimally-threaded screws are contactlessly encased in third through holes in the third set of through holes.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A ring laser gyroscope configured to reduce alignment shifts in at least one critical alignment of the ring laser gyroscope, the ring laser gyroscope comprising:
reflective components configured to direct clockwise optical beams and counter-clockwise optical beams in at least one lasing plane;
at least one ring-laser-gyro mounting feature having at least one respective through hole; and
at least one minimally-threaded screw positioned in the at least one respective through hole, wherein an unthreaded section of the minimally-threaded screw is contactlessly encased in the at least one respective through hole, and
wherein a threaded-end of the at least one minimally-threaded screw is threaded in a respective at least one threaded hole in a gyro frame, the gyro frame spanning a reference mounting plane.

2. The ring laser gyroscope of claim 1, wherein the at least one lasing plane is a single lasing plane the ring laser gyroscope, and wherein the at least one ring-laser-gyro mounting feature is a gyro motor including the at least one respective through hole, wherein the critical alignment is between the single lasing plane in the ring laser gyroscope and the reference mounting plane.

3. The ring laser gyroscope of claim 1, wherein the at least one respective through hole includes three through holes, wherein the at least one minimally-threaded screw positioned in the at least one respective through hole includes three minimally-threaded screws positioned in three respective through holes in the at least one ring-laser-gyro mounting feature.

4. The ring laser gyroscope of claim 1, wherein the at least one lasing plane is a single lasing plane the ring laser gyroscope, wherein the at least one ring-laser-gyro mounting feature is a plug including the at least one respective through hole, wherein the critical alignment is between the single lasing plane in the ring laser gyroscope and the reference mounting plane.

5. The ring laser gyroscope of claim 1, wherein the gyro frame is a gyro housing.

6. The ring laser gyroscope of claim 1, wherein the gyro frame is a gyro housing, wherein at least one minimally-threaded screw includes three minimally-threaded screws and the at least one threaded hole in the gyro frame includes three threaded holes in the gyro housing,
wherein each of the three minimally-threaded screws is threaded in a respective one of the three threaded holes in the gyro housing, wherein the three unthreaded sections of the three minimally-threaded screws are contactlessly encased in respective ones of the three through holes.

7. The ring laser gyroscope of claim 1, wherein the ring laser gyroscope is a multi-axis ring laser gyroscope, wherein at least one lasing plane is three mutually orthogonal lasing planes, wherein the at least one critical angular relationship is the angular relationship between a first sense axis and a second sense axis, between the second sense axis and a third sense axis, and between third sense axis and the first sense axis.

8. The ring laser gyroscope of claim 7, wherein the reflective components comprise:
   a first set of reflective components;
   a second set of reflective components; and
   a third set of reflective components;
wherein the at least one ring-laser-gyro mounting feature comprises:
   a first ring-laser-gyro mounting feature having a first set of through holes for a first set of minimally-threaded screws;
   a second ring-laser-gyro mounting feature having a second set of through holes for a second set of minimally-threaded screws; and
   a third ring-laser-gyro mounting feature having a third set of through holes for a third set of minimally-threaded screws.

9. A multi-axis ring laser gyroscope configured to reduce alignment shifts between respective multiple sense axes of the multi-axis ring laser gyroscope, the ring laser gyroscope comprising:
   a first set of reflective components configured to direct clockwise optical beams and counter-clockwise optical beams in a first lasing plane, the first lasing plane perpendicular to a first sense axis;
   a first ring-laser-gyro mounting feature having a first set of through holes including at least one through hole;
   a first set of minimally-threaded screws positioned in the first set of through holes, wherein unthreaded sections of the minimally-threaded screws in the first set of minimally-threaded screws are contactlessly encased in the first set of through holes, and wherein threaded-ends of minimally-threaded screws in the first set of minimally-threaded screws are threaded in a first set of threaded holes in a gyro frame to fixedly attach the first ring-laser-gyro mounting feature to the gyro frame;
   a second set of reflective components configured to direct clockwise optical beams and counter-clockwise optical beams in a second lasing plane, the second lasing plane being perpendicular to the first lasing plane, and the second lasing plane perpendicular to a second sense axis;
   a second ring-laser-gyro mounting feature having a second set of through holes including at least one through hole; and
   a second set of minimally-threaded screws positioned in the second set of through holes, wherein unthreaded sections of the minimally-threaded screws in the second set of minimally-threaded screws are contactlessly encased in the second set of through holes, and wherein threaded-ends of minimally-threaded screws in the second set of minimally-threaded screws are threaded in a second set of threaded holes in the gyro frame to fixedly attach the second ring-laser-gyro mounting feature to the gyro frame.

10. The multi-axis ring laser gyroscope of claim 9, further comprising:
   a third set of reflective components configured to direct clockwise optical beams and counter-clockwise optical beams in a third lasing plane, the third lasing plane perpendicular to a third sense axis, the third lasing plane being perpendicular to the first lasing plane and being perpendicular to the second lasing plane;
   a third ring-laser-gyro mounting feature having a third set of through holes including at least one through hole; and
   a third set of minimally-threaded screws positioned in the third set of through holes, wherein unthreaded sections of the minimally-threaded screws in the third set of minimally-threaded screws are contactlessly encased in the third set of through holes, and wherein threaded-ends of minimally-threaded screws in the third set of minimally-threaded screws are threaded in a third set of threaded holes in the gyro frame to fixedly attach the third ring-laser-gyro mounting feature to the gyro frame.

11. The multi-axis ring laser gyroscope of claim 10, wherein the gyro frame is a gyro housing, the multi-axis ring laser gyroscope further comprising:
   the gyro housing including the first set of threaded holes, the second set of threaded holes, and the third set of threaded holes.

12. The multi-axis ring laser gyroscope of claim 9, further comprising:
   the gyro frame including the first set of threaded holes and the second set of threaded holes.

13. The multi-axis ring laser gyroscope of claim 9, wherein the gyro frame is a gyro housing.

14. The multi-axis ring laser gyroscope of claim 9, wherein at least one of the first set of minimally-threaded screws and the second set of minimally-threaded is a set comprising a single minimally-threaded screw.

15. A method to reduce alignment shifts in at least one critical alignment of a ring laser gyroscope, the method comprising:
   positioning at least one set of reflective components in a gyro frame, the at least one set of reflective components configured to direct clockwise optical beams and counter-clockwise optical beams in at least one respective lasing plane;
   positioning at least one ring-laser-gyro mounting feature in the gyro frame; and
   inserting at least one set of minimally-threaded screws through at least one respective set of through holes in the at least one ring-laser-gyro mounting feature; and
   screwing threaded-ends of minimally-threaded screws in the at least one set of minimally-threaded screws into respective threaded holes in the gyro frame to attach the at least one ring-laser-gyro mounting feature to the gyro frame, wherein unthreaded sections of the minimally-threaded screws in the at least one set of minimally-threaded screws are contactlessly encased in through holes in the at least one respective set of through holes.

16. The method of claim 15, wherein positioning the at least one set of reflective components in the gyro frame comprises positioning one set of reflective components in a gyro housing, the one set of reflective components configured to direct the clockwise optical beams and the counter-clockwise optical beams in a single lasing plane, wherein positioning the at least one ring-laser-gyro mounting feature in the gyro frame comprises positioning a single ring-laser-gyro mounting feature in the gyro housing; and
   wherein inserting the at least one set of minimally-threaded screws through the at least one respective set of through holes comprises inserting a single set of minimally-threaded screws through a single set of through holes, the method further comprising:
   positioning the gyro housing on three mounting points that span a reference mounting plane,
   wherein the critical alignment of the ring laser gyroscope is an initial angular relationship between the single lasing plane in the ring laser gyroscope and the reference mounting plane.

17. The method of claim 15, wherein positioning the at least one set of reflective components in the gyro frame comprises:

- positioning a first set of reflective components in a gyro housing, the first set of reflective components configured to direct clockwise optical beams and counter-clockwise optical beams in a first lasing plane, the first lasing plane being perpendicular to a first sense axis; and
- positioning a second set of reflective components in the gyro housing, the second set of reflective components configured to direct clockwise optical beams and counter-clockwise optical beams in a second lasing plane, the second lasing plane being perpendicular to a second sense axis, and the second lasing plane being perpendicular to the first lasing plane,
- wherein positioning the at least one ring-laser-gyro mounting feature in the gyro housing comprises:
- positioning a first ring-laser-gyro mounting feature in the gyro housing; and
- positioning a second ring-laser-gyro mounting feature in the gyro housing;
- wherein the critical alignment is between the first sense axis and the second sense axis.

18. The method of claim 17, wherein inserting the at least one set of minimally-threaded screws through the at least one respective set of through holes comprises:

- inserting a first set of minimally-threaded screws through a first set of through holes; and
- inserting a second set of minimally-threaded screws through a second set of through holes,
- wherein screwing threaded-ends of minimally-threaded screws in the at least one set of minimally-threaded screws into respective threaded holes in the gyro frame, comprises:
- screwing threaded-ends of first minimally-threaded screws in the first set of minimally-threaded screws into first threaded holes in the gyro housing to attach the first ring-laser-gyro mounting feature to the gyro housing, wherein unthreaded sections of the minimally-threaded screws in the first set of minimally-threaded screws are contactlessly encased in first through holes in the first set of through holes; and
- screwing threaded-ends of second minimally-threaded screws in the second set of minimally-threaded screws into second threaded holes in the gyro housing to attach the second ring-laser-gyro mounting feature to the gyro housing, wherein unthreaded sections of the minimally-threaded screws in the second set of minimally-threaded screws are contactlessly encased in second through holes in the second set of through holes.

19. The method of claim 18, wherein positioning the at least one set of reflective components in the gyro housing further comprises:

- positioning a third set of reflective components in the gyro housing, the third set of reflective components configured to direct clockwise optical beams and counter-clockwise optical beams in a third lasing plane, the third lasing plane being perpendicular to a third sense axis, and the third lasing plane being perpendicular to the first lasing plane and the second lasing plane,
- wherein positioning the at least one ring-laser-gyro motor in the gyro housing further comprises:
- positioning a third ring-laser-gyro mounting feature in the gyro housing, wherein the critical alignment is between the first sense axis and the third sense axis and between the second sense axis and the third sense axis.

20. The method of claim 19, wherein inserting the at least one set of minimally-threaded screws through the at least one respective set of through holes further comprises:

- inserting a third set of minimally-threaded screws through a third set of through holes;
- wherein screwing threaded-ends of minimally-threaded screws in the at least one set of minimally-threaded screws into respective threaded holes in the gyro, further comprises:
- screwing threaded-ends of third minimally-threaded screws in the third set of minimally-threaded screws into third threaded holes in the gyro housing to attach the third ring-laser-gyro mounting feature to the gyro housing, wherein unthreaded sections of the minimally-threaded screws in the third set of minimally-threaded screws are contactlessly encased in third through holes in the third set of through holes.

* * * * *